UNITED STATES PATENT OFFICE.

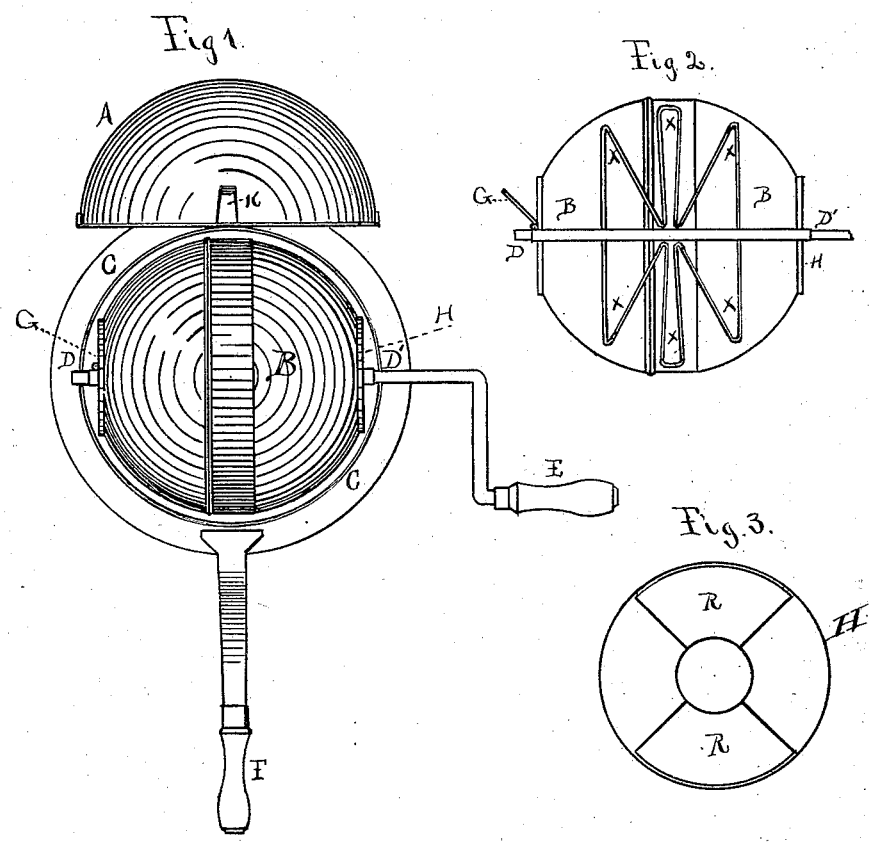

JULIAN GRZYBOWSKI, OF GRAND RAPIDS, MICHIGAN.

IMPROVEMENT IN COFFEE-ROASTERS.

Specification forming part of Letters Patent No. 222,131, dated December 2, 1879; application filed November 25, 1878.

*To all whom it may concern:*

Be it known that I, JULIAN GRZYBOWSKI, of Grand Rapids, in the county of Kent and State of Michigan, have invented a new and useful Improvement in Coffee-Roasters, of which the following is a specification.

The invention relates to the use of arms or stirrers, constructed as hereinafter described, in combination with a spherical coffee-roaster, in which the coffee is placed to be roasted, and which is then revolved slowly over the fire.

The object of my invention is to enable the user to roast coffee evenly and quickly, and without allowing smoke to escape into the room, and at the same time provide means to ascertain when the coffee is done without opening the roaster.

The invention is intended to be used on a common stove in place of the griddle; and it consists in a hollow spherical case hung upon a revolving shaft, which is provided with various projecting arms, hereinafter described, to thoroughly mix the coffee, and a crank, and turns on a rim, which rests on the stove. The case has an opening on one side, to receive and pour out the coffee, and on the other side one or more panes of isinglass, to enable the operator to see when the coffee is done. It is also provided with a cover, hinged upon the rim on which the shaft turns, to prevent smoke escaping into the room.

In the accompanying drawings, in which similar letters of reference indicate like parts, Figure 1 is a top view of my invention, with the cover turned back. Fig. 2 is a sectional view of my invention, showing the arms attached to the shaft and the lid partly open; and Fig. 3 is a view of the panes of isinglass set on one side of the spherical case.

My invention is made of cast and sheet iron, or other suitable metal.

C is the rim, which rests on the stove, with its inner edge projecting upward to receive the cover A. D D' is the shaft, provided with arms X X X, and on which the spherical case B is hung. It is provided with a crank, E, and turns in grooves cut in the rim C.

The case B is made from two hollow half-spherical pieces of metal, fitting one into the other at their edges, and held in place by pins running through the shaft D D' at the outer surface of the case.

G is a lid, which is a part of, and hinged to, a cap formed around the crank at D, and is kept in place by being sprung on a projecting rim of an orifice in the spherical case. A similar cap, H, but without a hinge, is placed on the crank side of the case B, and in this cap are inserted panes of isinglass, as shown by R R in Fig. 3.

The arms X X X are wire projections attached to the shaft, and serve to aid in mixing the coffee while roasting, and thus secure its being evenly and uniformly done.

I am aware that stirrers in machines of this kind have been long in use, and hence desire to secure to myself only a stirrer of the particular form and construction herein described, which I believe to be new.

The essential principle in my stirrer consists in the attaching to a central shaft of a row or series of arms, some or all of which are oblique to the axis of the shaft.

In constructing my invention I insert wire bent into the form shown by X X X in Fig. 2 into the shaft D D' on its four faces, as shown.

The outer extremities of the stirrers should approach closely to the inner surface of the case B; and if a different form of case is adopted, the length of the arms can be modified accordingly.

The cover A is hinged to the rim C, and when the machine is in use fits closely over its inner projecting edge, and thus prevents the escape of smoke into the room. It is provided with a handle, K, to assist in raising.

To use my invention, partially fill the case B with coffee through the lid G, and then set the same over the griddle-opening in a stove; put the cover down, and slowly turn the crank till the coffee is roasted.

What I claim is—

The arms X X X, in combination with shaft D D' and spherical case B, substantially as described.

JULIAN GRZYBOWSKI.

Witnesses:
 OMAR H. SIMONDS,
 SIMON DRIMISZEWSKI.